United States Patent [19]

Reynolds et al.

[11] 4,246,806

[45] Jan. 27, 1981

[54] MULTI-MODE HYDROMECHANICAL TRANSMISSION SHIFT SYSTEM

[75] Inventors: David W. Reynolds, Huxley; Frederic W. Pollman, Ames, both of Iowa

[73] Assignee: Sundstrand Corporation, Rockford, Ill.

[21] Appl. No.: 869,755

[22] Filed: Jan. 16, 1978

[51] Int. Cl.³ .................. F16H 47/04; F16H 47/00
[52] U.S. Cl. ........................... 74/687; 74/731; 74/732; 74/733; 74/869
[58] Field of Search ................ 74/687, 720.5, 731, 74/732, 733, 861, 862, 863, 864, 865, 867, 868, 869

[56] References Cited

U.S. PATENT DOCUMENTS

| | | | |
|---|---|---|---|
| Re. 27,307 | 3/1972 | De Lalio | 74/687 |
| 3,204,486 | 9/1965 | De Lalio | 74/687 |
| 3,212,358 | 10/1965 | De Lalio | 74/687 |
| 3,293,932 | 12/1966 | Boydell et al. | 74/732 X |
| 3,299,742 | 1/1967 | General | 74/687 |
| 3,396,607 | 8/1968 | Ross | 74/687 |
| 3,406,597 | 10/1968 | De Brie Perry et al. | 74/865 |
| 3,442,153 | 5/1969 | Ross | 74/687 |
| 3,545,302 | 12/1970 | Schofield | 74/865 X |
| 3,552,232 | 1/1971 | Kress | 74/689 |
| 3,640,157 | 2/1972 | Schaefer | 74/869 |
| 3,733,931 | 5/1973 | Nyman et al. | 74/868 |
| 3,842,694 | 10/1974 | Marlow | 74/865 X |
| 4,046,033 | 9/1977 | Hashimoto | 74/869 |
| 4,080,850 | 3/1978 | Bubula et al. | 74/861 |
| 4,096,768 | 6/1978 | Miyao | 74/865 |
| 4,122,732 | 10/1978 | Chana | 74/861 X |

FOREIGN PATENT DOCUMENTS 2417328 11/1974 Fed. Rep. of Germany ............ 74/867
45-13325 5/1970 Japan ......................................... 74/869

Primary Examiner—Leslie Braun
Attorney, Agent, or Firm—Wegner, Stellman, McCord, Wood & Dalton

[57] ABSTRACT

A multi-mode hydromechanical transmission shift system having a hydrostatic unit with at least one variable and reversible displacement component with a displacement control, a plurality of clutches independently operable for setting the mode of operation of the transmission and a control circuit including a plurality of valves for setting the mode of operation and responsive to the position of the displacement control for causing a shift in operation from one clutch to the other to change the mode of operation.

16 Claims, 6 Drawing Figures

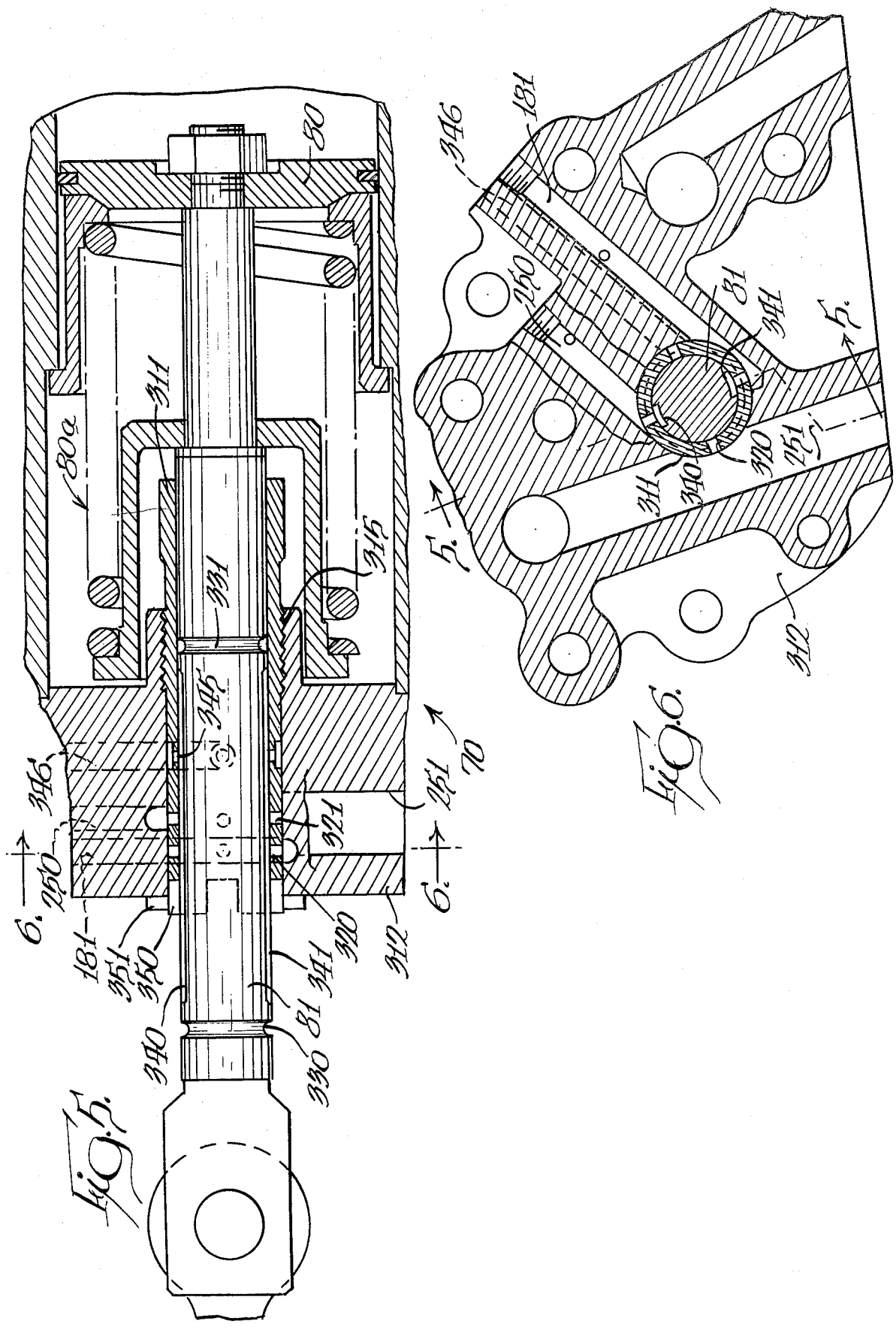

MULTI-MODE HYDROMECHANICAL TRANSMISSION SHIFT SYSTEM

BACKGROUND OF THE INVENTION

This invention pertains to a multi-mode hydromechanical transmission shift system utilizing the displacement position of a variable displacement component of a hydrostatic unit of the transmission to initiate mode changes and having a control circuit with a plurality of valves providing reliability and resistance to nuisance reshifting.

Previous multi-mode hydromechanical transmissions have used differential speed sensing to initiate mode shifts and such systems have been subject to error and reliability problems. Some of the previous systems have also used a time delay to prevent nuisance reshifts when under heavy load at vehicle speeds near the shift point.

The prior art also discloses hydromechanical transmissions having two modes of operation wherein the displacement position of a variable displacement unit or component of a hydrostatic unit is used to initiate mode changes. However, this prior art does not disclose a transmission having three or more modes of operation with mode changes being responsive to the position of the displacement control.

SUMMARY OF THE INVENTION

A primary feature of the invention is to provide a multi-mode hydromechanical transmission shift system utilizing the position of a variable displacement component to initiate mode changes with the shift being reliable, fail-safe, and without nuisance reshifting and with control circuitry permitting multi-mode operation utilizing the same shift components.

An object of the invention is to provide a multimode hydromechanical transmission shift system having at least three modes of operation and including a hydrostatic unit with at least one variable and reversible displacement component with displacement controlling means, a plurality of members independently operable for setting the mode of operation of the transmission, and control circuit means responsive to the position of the displacement controlling means at either of two positions at either side of neutral for operation of selected ones of said members to obtain said modes of operation.

Another object of the invention is to provide a multi-mode hydromechanical transmission shift system having plural modes of operation and including a hydrostatic unit with at least one variable displacement unit, a plurality of independently operable members for setting the mode of operation of the transmission, and a control circuit responsive to the position of the displacement controlling means for operation of selected ones of said members and including a memory valve having a valve member with two positions representing the operation of different ones of said members.

A further object of the invention is to provide a multi-mode hydromechanical transmission shift mechanism which avoids nuisance reshifts by sensing vehicle speed hysteresis wherein the transmission has a hydrostatic unit with at least one variable displacement component, a plurality of members for setting the mode of operation of the transmission and a control circuit including a hysteresis valve positionable in response to engine speed and through which a shift signal passes to prevent nuisance shifts between modes.

A further object of the invention is to provide a multi-mode hydromechanical transmission shift system as defined in the preceding paragraphs wherein a shift signal is derived from the position of displacement controlling means for a variable displacement component of a hydrostatic unit and with said shift signal generating means including structure for accurately establishing the shift position.

Still another object of the invention is to provide a multi-mode hydromechanical transmission shift system having a hydrostatic unit with at least one variable displacement component, a plurality of clutches independently operable to establish a selected mode of operation, and control circuit means responsive to the position of the displacement component for causing operation of a particular clutch including a memory valve having positions related to particular clutch operation, and a hysteresis valve responsive to the speed of the vehicle with which the transmission is associated to differentiate upshifts and downshifts and prevent nuisance reshifts.

BRIEF DESCRIPTION OF THE DRAWINGS

FIG. 5 is a central vertical section of the control servo for the variable displacement component and taken generally along the line 5—5 in FIG. 6; and FIG. 6 is a sectional view taken generally along the line 6—6 of FIG. 5.

DESCRIPTION OF THE PREFERRED EMBODIMENT

Figure 1:
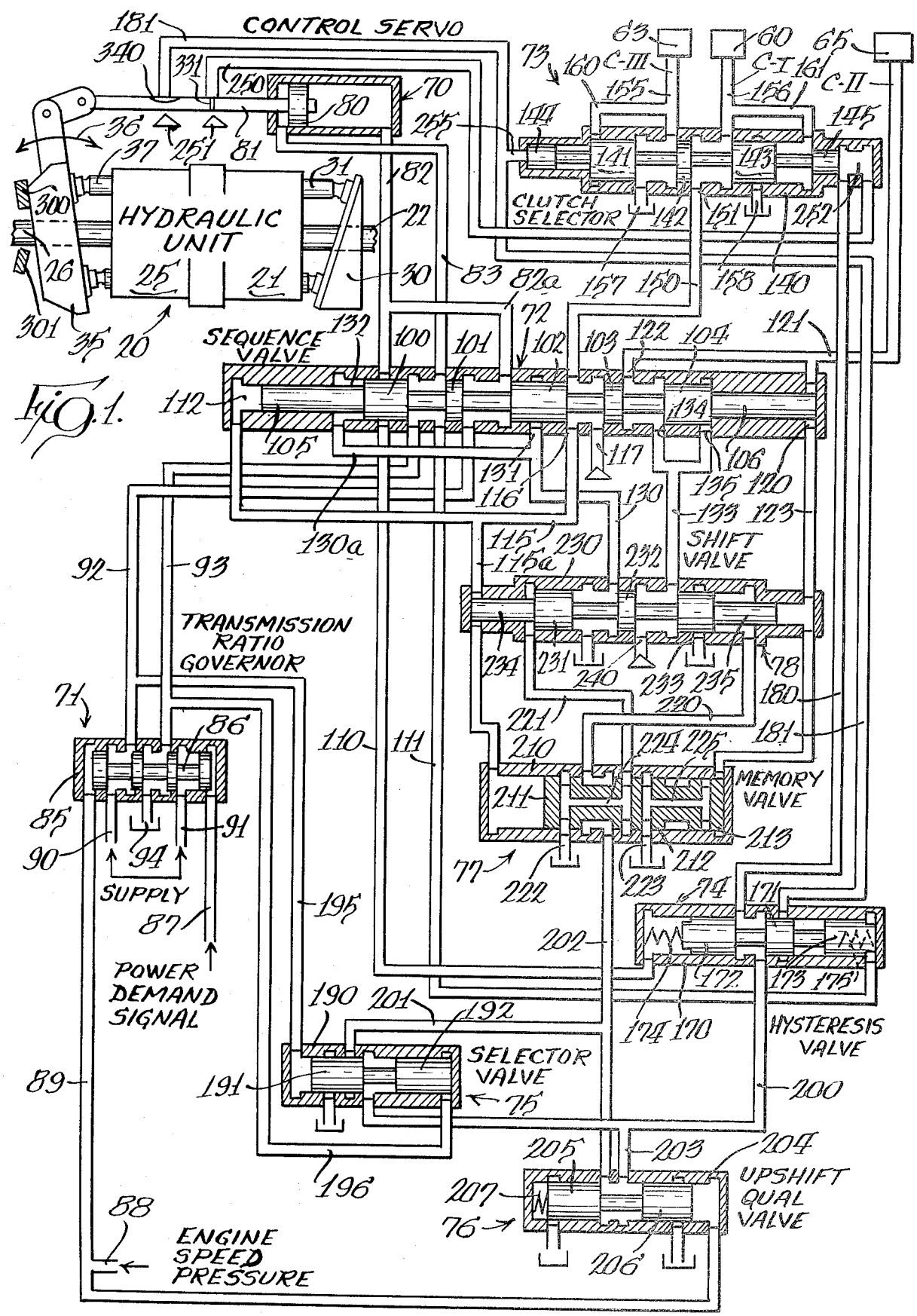
FIG. 1 is a schematic view of the multi-mode hydromechanical transmission and control circuit, with certain of the components positioned for initiating the shift from Mode I to Mode II.

The multi-mode hydromechanical transmission shift system disclosed herein is specifically shown for control of a three forward speed mode transmission, although additional modes may be utilized for additional clutch selector structure. A complete three-mode hydromechanical transmission for utilization of such system is disclosed in an application of Frederick W. Pollman, Ser. No. 825,844, filed Aug. 18, 1977, owned by the assignee of this application. This prior application shows several different hydromechanical transmissions having three forward speed modes and utilizing three different clutches for carrying out the three modes of operation. The disclosure of the hydromechanical transmissions in the various embodiments in said prior application is incorporated herein by reference. References herein to said prior application structure are for illustrative purposes only and not intended to limit the shift system to the particular hydromechanical transmission.

In order to facilitate an understanding of the shift system as related to a hydromechanical transmission, parts disclosed herein similar to those disclosed in the prior application are given the same reference numeral.

Referring to FIG. 1, the hydromechanical transmission includes a hydrostatic unit 20 having a fixed displacement component 21 in driving relation with a shaft 22. A variable displacement component 25 has a shaft 26 connectable to a prime mover, such as the engine of a vehicle having the transmission incorporated therein. The components 21 and 25 are hydraulically interconnected by a pair of lines (not shown). The components 21 and 25 are shown as axial piston units with the pistons 31 of the fixed displacement unit being under the control of a fixed swashplate 30 and the pistons 37 of the variable displacement unit being controlled by a swash plate 35 which is mounted for movement in two directions, as indicated by the arrow 36 to either of two maximum displacement positions at either side of a neutral or zero displacement position.

The control circuit disclosed herein is for the control of clutches 60, 63, and 65 for setting the mode of operation. As shown in the prior pending application, the clutch 60 provides for operation of a brake in a Mode I, low speed operation, the clutch 65 sets the planetary gearing of the hydromechanical transmission for operation in an intermediate speed range Mode II operation, and clutch 63 sets the transmission in an upper speed range Mode III operation.

The control components include displacement controlling means for the variable displacement component 25 in the form of a control servo 70. A transmission ratio governor 71 conrtrols the position of the control servo and, therefore, the displacement of the variable displacement component, with the connections therebetween being controlled by a sequence valve 72.

A clutch selector valve, indicated generally at 73, controls the operation of either clutches 60 or 63 while a section of the sequence valve 72 controls the operation of the clutch 65.

A shift signal, generated in a manner to be described, is directed to a series of valves in the control circuit, including a hysteresis valve 74 which may permit passage of the shift signal to either of a selector valve 75 or upshift qualifying valve 76 which are connected in parallel whereby one of these valves permits passage of a shift signal to a memory valve 77 and then to a shift valve 78.

The control servo 70 has a control piston 80 connected by a rod 81 to the movable swash plate 35 whereby, with the piston 80 normally being spring-centered by centering means 80a (FIG. 5), the angle of the swash plate 35 is controlled by pressure applied to the control piston 80. The cylinder of the control servo has a pair of lines 82 and 83 connected to opposite ends thereof and extending to the sequence valve 72 with the line 82 having a branch line 82a. The control of pressure in lines 82 and 83 is dependent upon the position of the sequence valve and also upon the action of the transmission ratio governor 71.

The transmission ratio governor 71 is in the form of a valve having a casing 85 with a multi-spool valve land 86 positioned dependent upon two pressure signals acting in opposition to each other. A power demand signal, as set, for example, by a throttle position responsive valve, is delivered through a line 87 to one end of the valve casing while an engine speed pressure signal delivered through a line 88, as from a governor valve responsive to engine speed, is directed through a line 89 to the opposite end of the valve spool. The valve spool controls the connection of supply pressure delivered to the valve casing through lines 90 and 91 to one or the other of a pair of lines 92 and 93 which extend to the sequence valve 72. With one of the lines 92 and 93 connected to supply pressure, the other of said lines is connected to drain 94.

The sequence valve 72 has a valve spool with spaced-apart lands 100, 101, 102, 103, and 104 and a pair of pressure-responsive pilot piston ends 105 and 106 at opposite ends thereof. These pilot piston ends are of a diameter and effective area less than the adjacent lands 100 and 104, respectively. The lands 100, 101, and 102 control the connection of the lines 92 and 93 from the transmission ratio governor 71 to the control servo 70. In the position shown in FIG. 1, line 92 is connected to line 82a and, therefore, line 82 leading to the right-hand end of the control servo. Line 93 is connected to line 83 directly through the sequence valve. In this position, the land 100 does not block flow between the line 82 and a line 110 leading to one end of the hysteresis valve 74. The control line 83 is in communication with a line 111 leading to the opposite end of the hysteresis valve 74. A pilot chamber 112 having the pilot piston 105 of the sequence valve is connected by a line 115 to a port 116 of the sequence valve adjacent a charge pressure port 117. The line 115 has a branch line 115a which extends to one end of the shift valve 78 and to one end of the memory valve 77.

A pilot chamber 120 of the sequence valve having the pilot piston 106 is connected by a line 121 to the clutch 65, with this line also connecting into a port 122 in the sequence valve. A line 123 connects the pilot chamber 120 to an end of the shift valve 78 and to an end of the memory valve 77.

A line 130 extends between the shift valve 78 and a port 131 of the sequence valve, as well as a pilot chamber 132 thereof. A second line 133 extends from the shift valve 78 and connects to a port 134 of the sequence valve and a pilot chamber 135.

The clutch selector valve 73 has a valve casing 140 having a valve spool with lands 141, 142 and 143 and a pair of pilot piston ends 144 and 145. The pilot piston ends are of a lesser diameter and lesser effective area than lands 141 and 143. A line 150 extends between the sequence valve 72 and a port 151 of the clutch selector valve, with the lands 141–143 controlling the connection of the port 151 to either of lines 155 and 156 extending to clutches 63 and 60, respectively. These lands also control connection of said lines to a pair of drain ports 157 and 158. The lines 155 and 156 have branch lines 160 and 161 which extend to ports of the clutch selector valve for pilot action on the lands 141 and 143, respectively.

The hysteresis valve 74 has a casing 170 movably mounting a valve member with an intermediate land 171 and opposite end lands 172 and 173 which are undercut around the periphery of their outer ends and with a pair of springs 174 and 175 urging the valve spool toward a central position.

A pair of shift signal lines 180 and 181 connect to the casing of the hysteresis valve 74 intermediate the ends thereof and with said lines being connected to shift signal generating means to be described and with line 180 also extending to an end of the clutch selector valve 73.

The selector valve 75 has a casing 190 with a valve spool having a pair of lands 191 and 192 subject to pressure conditions in lines 92 and 93 extending from the transmission ratio governor valve 71 by interconnecting lines 195 and 196, respectively. A shift signal delivered through the hysteresis valve 74 to a line 200 is delivered to the casing of the selector valve 75 and may be directed to an output line 201 dependent upon the position of the valve land 191. The output line 201 connects to a line 202 extending between the upshift qualifying valve 76 and the memory valve 77.

The upshift qualifying valve 76 has a casing 204 connected to line 200 by a branch line 203. A valve member with lands 205 and 206 controls the connection of line 203 to the line 202. A spring 207 urges the valve member toward the right, as viewed in FIG. 1, and engine speed pressure in line 89 is applied against land 206 in opposition to the spring 207.

The memory valve 77 has a casing 210, with a valve spool movable therein and having valve lands 211, 212, and 213. The central valve land 212 controls communication of the line 202 with either of a pair of lines 220 and 221 extending to the shift valve 78. In the position shown, the line 202 connects to the line 220. The memory valve 77 has a pair of drain ports 222 and 223 for receiving leakage and for selective connnection to either of the lines 220 and 221 which are not connected to the line 202, and through internal porting of the valve member. In the position shown in FIG. 1, the line 221 is connected by internal porting, including a longitudinal passage 224, to the drain port 222. When the memory valve is shifted to the left, the line 220 is then connected to the drain port 223 through internal porting, including the longitudinal passage 225.

The shift valve 78 has a valve casing 230 movably mounting a valve spool with valve lands 231, 232, and 233. The valve spool also has a pair of pilot pistons 234 and 235 at the opposite ends thereof. The central land 232 controls the connection of a charge port 240 to either of the lines 130 or 133 with the other line being connected to a drain port. The pilot pistons 234 and 235 are responsive to the pressure condition in either of lines 115a or 123 while the valve spool lands 231 and 233 are responsive to a shift pressure signal in either of the lines 220 or 221 and with this signal acting on an area provided by one or the other of the lands 231 and 233 which is larger than that of a pilot piston 234, 235.

The shift signal generating means is only shown diagrammatically in FIGS. 1–4 and a detailed description thereof will be given in connection with FIGS. 5 and 6. The shift signal generating means provides for a pressure shift signal in either of shift signal line 181 or a shift signal line 250. One of these lines may be selectively connected with a source 251 of charge pressure by the position of the control rod 81 which provides for positioning of the variable angle swash plate 35 under the control of the control servo 70. As the swash plate 35 moves to a maximum displacement position, shown in FIG. 1, charge pressure delivers a shift signal to the shift signal line 250 and directs it to a chamber 252 at an end of the clutch selector valve 73 where continued passage of the shift signal is controlled by the position of the pilot member 145 of the clutch selector valve spool. As the swash plate 35 moves in a clockwise direction to a position of maximum inclination, as viewed in FIG. 2, a charge pressure shift signal is delivered to the shift signal line 181 for delivery directly to the hysteresis valve 74 and also for application to the pilot piston 144 of the clutch selector valve through a branch line 255.

In normal operation of the transmission, the position of the variable angle swash plate 35 is controlled by a pressure signal delivered by the transmission ratio governor which compares the power demand signal with an engine speed pressure signal to correspondingly operate the control servo 70 for positioning of the swash plate to control the displacement of the variable displacement component 25. In operation in Mode I, which is the lowest forward range of operation, the transmission ratio governor valve 71 is delivering pressure to line 92 and through the sequence valve to the line 82 leading to the control servo. In this operation, the clutch 60 is engaged with fluid pressure engagement caused by charge pressure from charge port 117 of the sequence valve directed through line 150 to the line 156 leading to the clutch 60. This also positions the clutch selector valve to the left position, as shown in FIG. 1, by pressure through the branch line 161 acting on the larger diameter valve land 143. The pressure condition existing in line 92 from the transmission ratio governor is also existing in line 110 leading to the left-hand end of the hysteresis valve. The pressure condition of clutch 60 for Mode I also results in pressure in line 115 to apply pressure to the pilot chamber 112 of the sequence valve to urge the valve spool to the right, as shown in FIG. 1, and to also apply pressure to the pilot piston 234 of the shift valve 78 and to the valve member of the memory valve 77 to urge them to the right.

At the upper end of Mode I operation, the variable angle swash plate 35 has moved to a preestablished position to deliver a charge pressure shift signal to the shift signal line 250. This signal passes to the right-hand end chamber 252 of the clutch selector valve 73 and is free to pass to shift signal line 180. This passage through the clutch selector valve is for the purpose of blocking this shift signal if the transmission is operating in Mode III since at the upper end of Mode III operation a signal is also given to shift signal line 250 and the signal at that time should be blocked. The shift signal is delivered through line 180 to the hysteresis valve 74. This valve is positioned to the right, as shown in FIG. 1, because of the control pressure in line 110 and the shift signal passes through the hysteresis valve to line 200 where it is delivered to the selector valve 75 and the upshift qualifying valve 76. As more fully explained hereinafter, the hysteresis valve 74 provides for differentiating upshifts and downshifts and prevents nuisance reshifts by requiring a finite change in engine and vehicle speed in order to bias the hysteresis valve and allow a downshift signal therethrough.

The upshift qualifying valve is responsive to engine speed through line 89 with the engine speed pressure signal acting in opposition to the spring 207. This imposes a minimum engine speed and, therefore, minimum engine speed pressure on the control before the shift signal may proceed to initiate an upshift. This eliminates nuisance upshifting at low power, low speed conditions, such as encountered in slow speed heavy traffic. With engine speed pressure sufficient to allow an upshift, the upshift qualifying valve is in the position shown in FIG. 1, to allow the shift signal in line 203 to pass to the line 202 and to the memory valve 77. The selector valve 75 is inactive under powering load conditions, since it is positioned to the right, as shown in FIG. 1 and blocks the shift signal in line 200 from reaching the line 201. The selector valve 75 is active to bypass the upshift qualifying valve to allow downshifts at low engine speeds in response to braking pressure.

The shift signal in line 202 reaches the memory valve 77 which is in the position shown in FIG. 1, because of clutch pressure existing in clutch 60 and in lines 150 and 115a as previously described. The shift signal can then pass through the memory valve to a line 220 and act as a pilot signal upon the valve land 233 of the shift valve 78. The valve member of the shift valve would normally be in the right-hand position, rather than in the position shown in FIG. 1 because of the pressure existing in clutch 60 and line 115a. However, upon shift signal reaching the land 233, the valve member shifts to the position shown in FIG. 1. This permits charge pressure in charge port 240 to pass to the line 133 and to the port 134 whereby charge pressure can flow to line 121 leading to clutch 65 because of the valve land 104 of the sequence valve being in nonblocking relation. Charge pressure starts to fill the clutch 65. During this fill operation, the increasing pressure in clutch 65 is applied to both the pilot piston 106 of the sequence valve as well as the right-hand side of the sequence valve land 104 with the latter area being sized whereby when the filling pressure of clutch 65 reaches approximately two-thirds of the pressure existing in the engaged clutch 60 which is acting on pilot piston 105 of the sequence valve, the sequence valve shifts to the left from the position shown in FIG. 1. This shifts the land 102 of sequence valve to the left whereby line 150 connected to clutch 60 is connected to sequence valve port 131 whereby clutch 60 is connected to drain at the shift valve through line 130. The shifting of the sequence valve also results in a shift of lands 101 and 102 to the left whereby pressure in line 92 from the transmission ratio governor 71 is directed to line 83 leading to the left end of the control servo 70.

Figure 2:
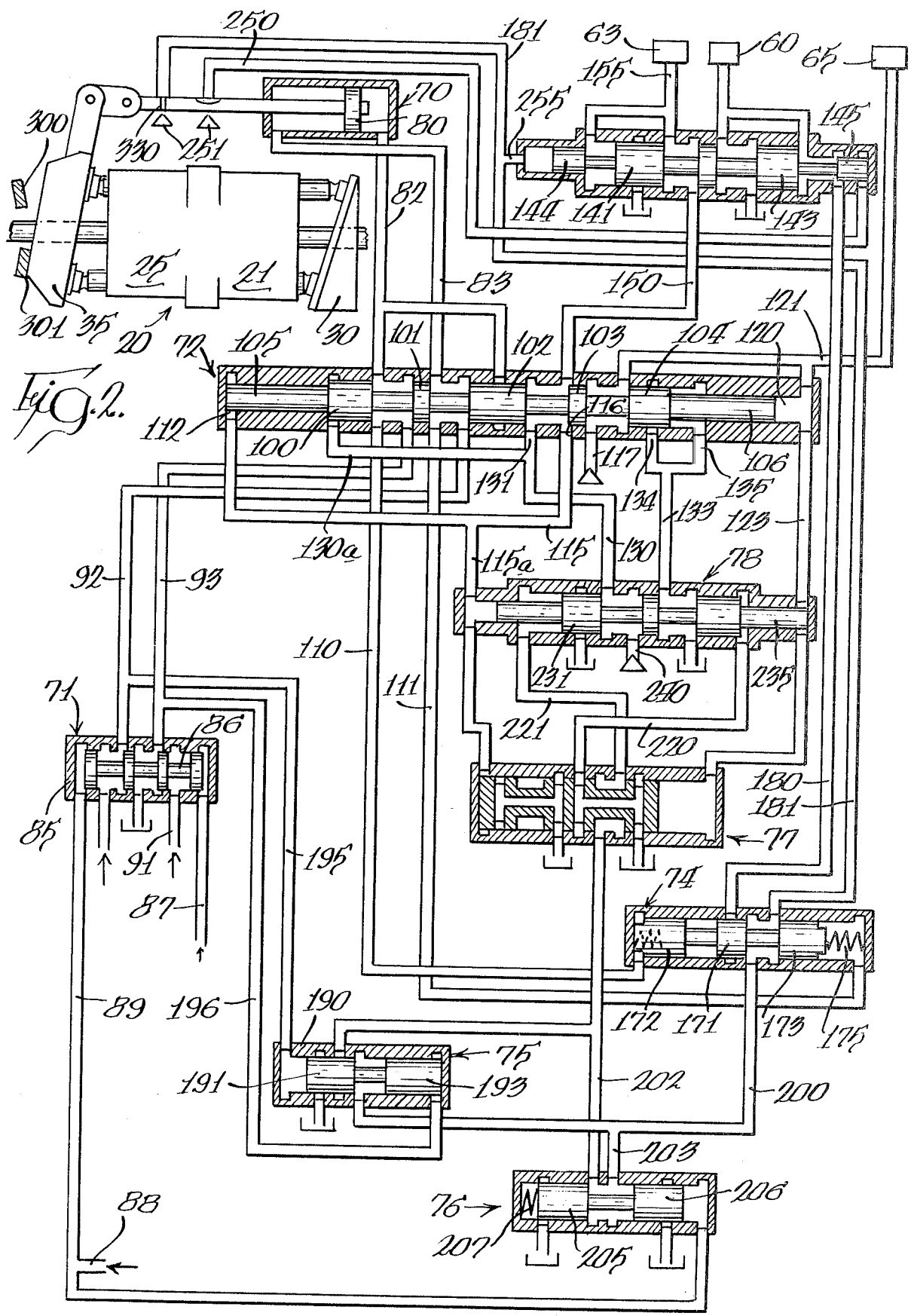
FIG. 2 is a view similar to FIG. 1 showing certain components of the control circuit positioned for operation in Mode II and others positioned for the shift from Mode II to Mode III.

In Mode II operation, the line 111 leading to the hysteresis valve 74 is pressurized to shift the valve spool to the left, as shown in FIG. 2, with line 110 connected to drain. This prevents the passage of another shift signal through shift signal line 250 causing a shift except in response to a vehicle speed change as described subsequently. With clutch 65 engaged under pressure, there is pressure in line 121 which, through line 123, maintains the sequence valve to the left and also positions the shift valve 78 and memory valve 77 to the left, with the line 115a and line 115 being connected to drain through the port 131 and line 130 leading to the drain connection at the shift valve 78.

In Mode I, the transmission has operated with the variable angle swash plate 35 operating between a zero displacement position and a minus angle, as shown in FIG. 1. In the operation of the hydromechanical transmission, shown in the above-identified application, and with operation of the clutch 60, this would be a pure hydrostatic mode of operation. After shift to Mode II, the swash plate 35 operates from the minus angle, shown in FIG. 1, to a maximum positive angle position, shown in FIG. 2, which would result in a lower ratio of the hydromechanical transmission as the vehicle speed increases. The transmission ratio is the ratio of input to output speeds.

The lowest ratio and highest vehicle speed in Mode II is obtained with the swash plate 35 in the position of FIG. 2. This results in generation of a shift signal from the charge source 251 to the shift signal line 181 and delivery thereof to the hysteresis valve 74. Additionally, a shift signal in line 181 is applied through the branch line 255 to the pilot piston 144 of the clutch selector valve 73 to shift the valve to the right, as shown in FIG. 2. This sets the clutch selector valve for operation of clutch 63 for Mode III operation by communication of the line 155 with the line 150. The shift signal in line 181 passes through the hysteresis valve 74 to the line 200 and through the upshift qualifying valve 76 to the memory valve 77. This valve is in the left position, as shown in FIG. 2, whereby the shift signal passes therethrough to the line 221 and acts as a pilot signal against the left-hand side of the shift valve land 231. The pressure acting on the valve land 231 moves the shift valve to the right against the pressure of clutch 65 acting on the valve piston 235 and charge pressure from port 240 is directed through a line 130 to the sequence valve 72 and then to the line 150 to start filling clutch 63 for Mode III operation.

As pressure builds up in clutch 63, this pressure acts through a branch 130a of the line 130 against the left side of the land 100 of the sequence valve and the area is sized relative to the pilot piston 106 of the sequence valve whereby when the clutch pressure in clutch 63 reaches approximately two-thirds of operating pressure, the squence valve is shifted to the right. This then places line 121 for clutch 65 in communication with a drain passage at the shift valve 78 through line 133 which extends between the sequence valve 72 and the shift valve 78. This shift of the sequence valve now returns control pressure from the transmission ratio governor 71 in line 92 to the control line 82 leading to the control servo. As a result, pressure in line 110 leading to the left-hand end of the hysteresis valve 74 positions the latter valve to the right. There is clutch pressure in line 115a to have the shift valve maintained in the right-hand position and also have the memory valve 77 in the right-hand position during operation in Mode III. During this operation, line 123 leading to the right-hand end of the shift valve 78 and memory valve 77 is connected to line 121 and, therefore, to drain. In Mode III, the swash plate 35 operates from the shift position, shown in FIG. 2, at a positive angle back towards the negative angle position of FIG. 1. If the swash plate should move to the position of FIG. 1 providing a shift signal in line 250, this shift signal, which would indicate a shift to Mode II from Mode I, will not operate the system because the signal is blocked at the clutch selector valve 73 by having the pilot piston 145 in the position shown in FIG. 2.

Figure 3:
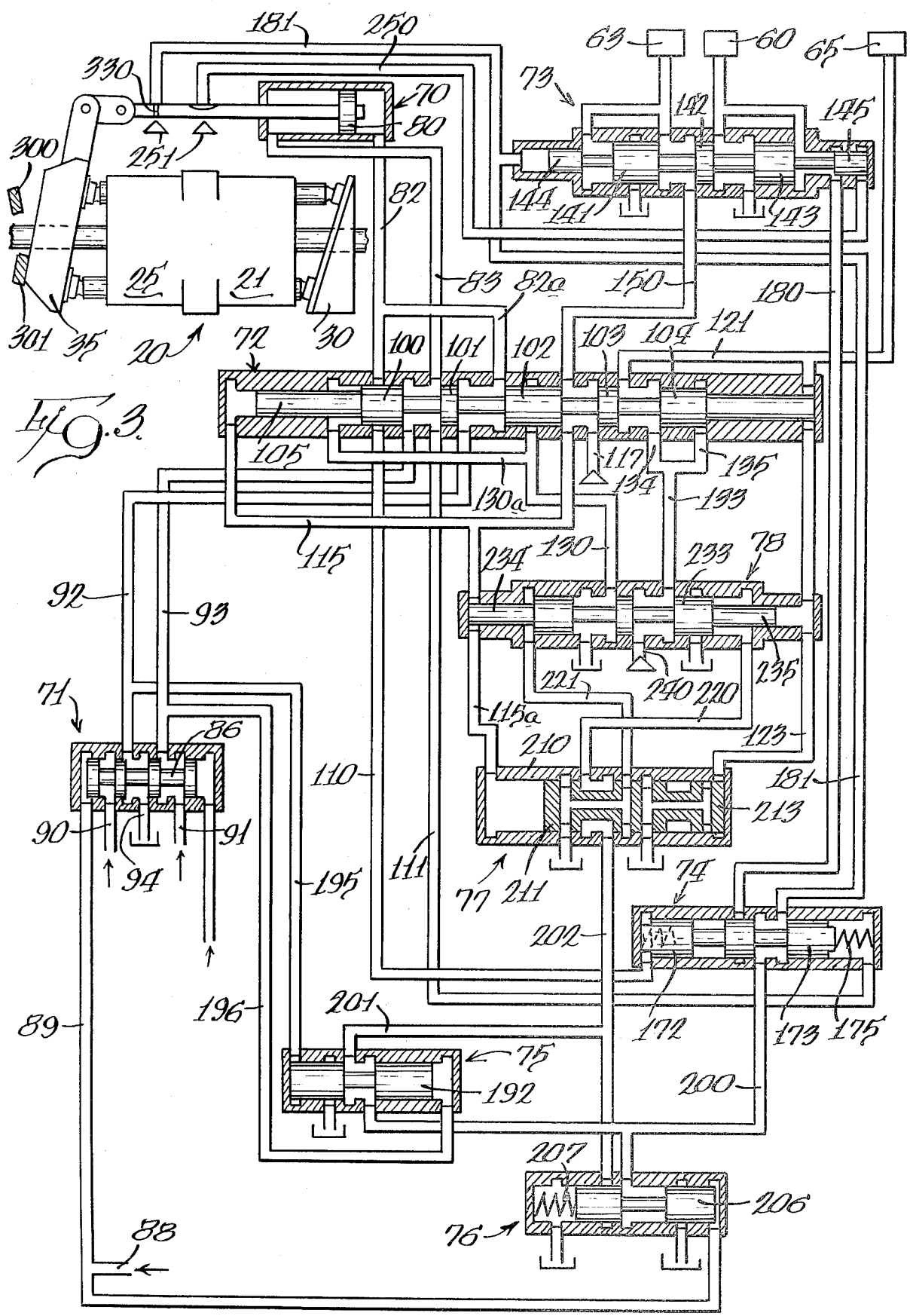
FIG. 3 is a view similar to FIG. 1 showing the parts positioned in process of shifting from Mode III to Mode II.
Figure 4:
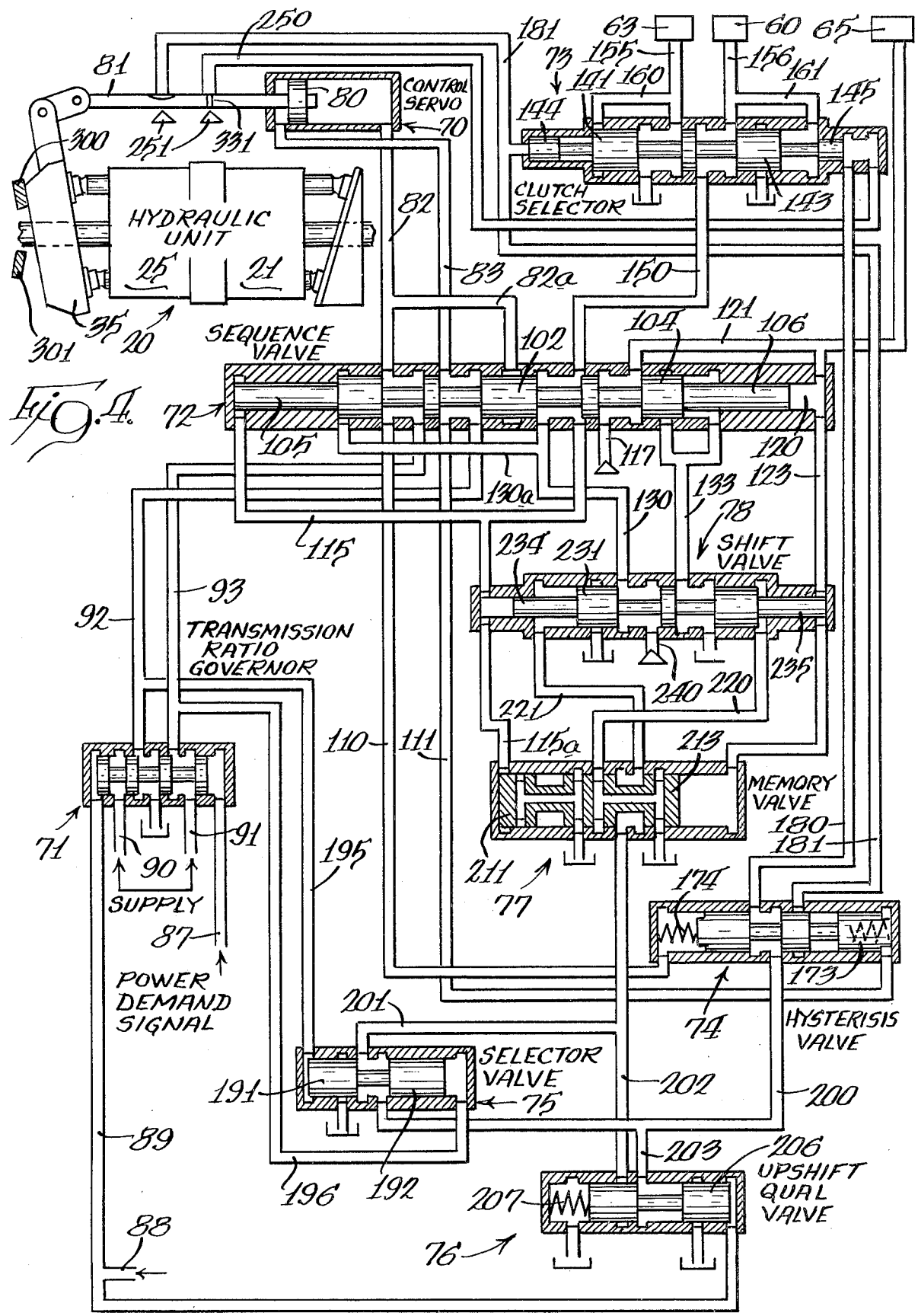
FIG. 4 is a view similar to FIG. 1 showing the parts positioned in process for shifting from Mode II to Mode I.

During operation in Mode III, if the load increases, the swash plate 35 will move toward an increasing ratio position toward the position shown in FIG. 2 at a positive angle to again provide a shift signal to the shift signal line 181. This signal is delivered to the hysteresis valve 74 and with the valve spool thereof positioned to the right (pressure in line 110) the signal is blocked. At this point in operation, it is necessary to take into account the action of the vehicle engine and the effect thereof on the engine speed pressure signal in lines 88 and 89. As shown in FIGS. 1 and 2, the variable angle swash plate 35 operates relative to a pair of fixed stops with a fixed stop 300 limiting the negative angle position of the swash plate 35 as shown in FIG. 1 and a fixed stop 301 limiting the positive angle position of the swash plate, as shown in FIG. 2. In the powering mode shift from Mode III to Mode II, with the swash plate in the position of FIG. 2 to deliver a shift signal to line 181, the signal is blocked at the hysteresis valve 74 as previously mentioned. When the swash plate 35 contacts the stop 301 at or shortly after the time the shift signal is given to place the transmission in fixed ratio, the engine lugs under the increasing load and engine speed pressure derived from a governor valve drops. This results in the ratio governor valve 71 moving to the left to a position, such as shown in FIG. 3. This causes supply pressure in line 91 to be directed to the control line 93 as a braking pressure and the line 92 connects to drain 94. This delivers braking pressure to line 83 and the left side of control servo 70. This has no effect on the swash plate 36 since the swash plate is already against the stop 301. As a result, the vehicle does not brake and the ratio does not change. The braking pressure in line 83 is also directed to line 111 and to the right-hand end of the hysteresis valve 74 to shift the hysteresis valve to the left, allowing the shift signal in line 181 to pass therethrough to the line 200. The shift signal can pass through the selector valve 75, since the control pressure in line 93 also is present in line 196 leading to the selector valve and acts on the land 192 thereof to shift the valve to the left position, shown in FIG. 3. The shift signal passing through the selector valve 75 is directed to the line 201 and to the line 202 where it passes to the memory valve 77. As previously mentioned, the memory valve 77 and the shift valve 78 are in the right-hand position because of pressure in the line 115a. With these positions, the shift signal in line 202 passes to the line 220 and to the right-hand side of the shift valve land 233 to shift the shift valve to the left-hand position shown in FIG. 3. A charge pressure signal from port 240 passes to the line 133 and to the line 121 to commence filling of the clutch 65. As previously mentioned in connection with shift from Mode I to Mode II, as the clutch 65 is filling, a pressure level is reached whereby pressure in line 135 acting on the land 104 of the sequence valve 72 shifts the sequence valve to the left to connect line 150 to drain through the sequence valve and line 130 at the shift valve to disengage clutch 63 and return the transmission to operation in Mode II.

If engine speed is then within the proper range, the transmission ratio governor valve 71 is back to a position to provide control pressure in line 92 which acts to supply pressure in line 83 and to the left side of the servo 70 for normal operation in Mode II. If however the load continues to increase in Mode II, the swash plate 35 moves to a position shown in FIG. 4 and upon reaching that position provides a shift signal to line 250. With pressure of clutch 63 no longer acting on the valve land 141 of the clutch selector valve 73, the shift signal applied to the right-hand end of the pilot piston 145 shifts the clutch selector valve 73 to the left. This sets the last-mentioned valve for operation of clutch 60. The swash plate 35 is against the stop 300 and, if the engine lugs, the engine speed pressure drops and the ratio governor valve 71 moves to the left, as shown in FIG. 4, to again have control pressure in line 93 connected through the sequence valve to line 82 at the right-hand end of the control servo 70. This results in pressure in line 110 which again shifts the hysteresis valve from a blocking position relative to shift signal line 180 to shift it to the right and permit the shift signal to pass through to the line 200 and also pass through the selector valve 75 because of the reduced engine speed pressure. With clutch 65 engaged, the memory valve 77 and shift valve 78 are shifted to the left whereby the shift signal passes through the memory valve to the line 221 and shifts the shift valve 78 to the right by pressure acting on the land 231. This results in charge pressure at port 240 flowing to line 130 and through the sequence valve 72 to the line 150 and through the clutch selector valve 73 to clutch 60. As pressure builds up in clutch 60, this pressure is applied through line 130a to shift the sequence valve to the right and with the transmission then operates in Mode I.

With the foregoing description of the shifts both upshifting and downshifting in a powering mode, it will be noted that the hysteresis valve 74 differentiates between upshifts and downshifts and prevents nuisance reshifts by requiring a finite change in engine and vehicle speed whereby a braking pressure is created in line 93 connected to the transmission ratio governor 71 in response to a decreasing engine speed pressure signal in order to permit the hysteresis valve to shift and permit passage of the downshift signal.

Braking upshifts and downshifts are accomplished in a similar manner to powering upshifts and downshifts. When making a braking upshift, for example, from Mode II to Mode III, the engine speed pressure signal in line 89 must exceed the power demand signal in line 87 to shift the transmission ratio governor valve 71 to the right. This results in supply pressure in line 90 being delivered to control line 92. Control pressure in line 83 is then being applied to the left-hand end of the control servo 70 and urges the swash plate 35 to the position of FIG. 2 to obtain a shift signal in line 181. This shift signal goes through the hysteresis valve 74 because of pressure in line 111 which has the hysteresis valve shifted to the left, as shown in FIG. 2.

A braking downshift from Mode III to Mode II, for example, would have the variable angle swash plate 35 positioned as shown in FIG. 3, with a shift signal delivered to line 181 and with braking pressure in line 93 to have the selector valve 75 positioned to the left and ultimately have the hysteresis valve positioned to the left whereby the shift signal can reach the memory valve 77 and the shift valve 78 to effect a downshift similarly as described previously in connection with FIG. 3.

The control circuit disclosed herein utilizes a building block shift sequence allowing multi-mode operation with the same shift hardware and clutch selector valve. The shift scheme can be adapted to transmissions having more or less than three modes by altering the clutch selector valve 73. This capability is provided by the memory valve 77 which is held in a left-hand position by pressure existing in clutch 65 and is held in a right-hand position when either of clutches 60 or 63 are engaged under full operating pressure.

Nuisance reshifts are avoided by sensing vehicle speed hysteresis by utilization of the hysteresis valve 74.

In the prior application identified herein, the use of equal angle shifts for the fixed and variable angle swash plates, such as the swash plates 30 and 35 respectively, disclosed in the instant application is described and the position shift method of initiating shifts as disclosed in the instant application can be used to provide for such equal angle shifts.

It is possible to vary the shift angle of the swash plate 35 to optimize transmission performance, such as shift smoothness. A structure for generating shift signals and enabling a degree of adjustment of the shift angle is shown in FIGS. 5 and 6.

Referring to FIG. 5, the piston 80 of the control servo is spring-urged to a central position by a centering mechanism, indicated generally at 80a, and with the rod 81 extending through a sleeve 311 threadably mounted in a housing 312, as indicated at 315. The sleeve 311 has two sets of ports, spaced apart lengthwise of the sleeve, with there being four of the ports 320 and four of the ports 321. The ports of each set are equally spaced circumferentially of the sleeve. These two sets of ports communicate with a charge pressure passage 251, as identified in the schematic views, FIGS. 1 to 4. With the relation as shown in FIG. 6, the charge pressure passage 251 communicates with at least one port of each of the sets 320 and 321. The rod 81 has a pair of spaced-apart annular grooves 330 and 331. When the swash plate 35 moves to the negative angle position, as shown in FIG. 1, the annular groove 331 on the rod 81 is moved into alignment with the series of sleeve ports 321 whereby charge pressure, which is in continuous communication with one of the ports, is permitted to flow through the annular groove 331 to another of the ports 321 which communicates with the shift signal line 250. In order to take care of leakage, the rod 81 has a pair of longitudinally-extending grooves positioned oppositely on the shaft of the rod including an upper groove 340 and a lower groove 341 and with these two grooves being aligned with a pair of the ports of each of the series of ports 320 and 321, as shown particularly in FIG. 6. Thus with the swash plate positioned as shown in FIG. 1, and the annular groove 331 providing for transmission of a shift signal to the line 250 through ports 321, the elongate grooves 340 and 341 are communicating with one of the ports 320 which does not communicate with the charge pressure line 251 to permit leakage external of the housing 312. When the swash plate moves to a maximum positive angle position, as shown in FIG. 2, the annular groove 330 is brought into communication with the ports 320 whereby charge pressure delivered to one of the ports is carried around to the other ports and with one of these ports communicating with the shift signal line 181. At this time, the longitudinal grooves 340 and 341 connect the ports 321 to a drain passage 345 through a series of ports 345 in the sleeve.

The outer end of the sleeve 311 has a series of teeth 350 for engagement by a similarly-toothed plate 351 which can be releasably held to the face of the housing 312. There are four of the teeth whereby the plate 351 may be selectively engaged with the sleeve in a particular orientation and then attached to the housing to provide four different 90° relative positions of the sleeve. This imparts longitudinal adjustment of the position of the sleeve to vary the coaction of the control ports 320 and 321 with the rod 81 whereby a range of adjustment is provided for the angle of the swash plate to initiate mode shift.

We claim:

1. A multi-mode hydromechanical transmission shift system having a hydrostatic unit with at least one variable and reversible displacement component with displacement setting means operable to control the direction and amount of displacement, a plurality of members separately operable for setting the mode of operation of the transmission, and control circuit means responsive to a shift signal generated by the position of the displacement controlling means for operation of a selected member other than the member currently in operation, a memory valve positioned dependent on the member which is in operation, shift signal generating means for generating said shift signal indicating a predetermined position of the displacement controlling means, said control circuit means including a clutch selector valve, a shift valve piloted to one of two positions by said shift signal for delivering pressure fluid to said clutch selector valve, said memory valve being operable for directing said shift signal as a pilot signal to the shift valve, a hysteresis valve as part of said control circuit means and through which said shift signal passes in advance of said memory valve and operable to prevent nuisance shifts between modes, said variable displacement unit being an axial piston pump with a variable angle swash plate, said displacement setting means including a control servo having a piston rod connected to said swash plate, and said shift signal generating means including a pair of pressure ports in a housing surrounding a part of said rod, said housing also having a pair of shift signal lines, and means on said rod operable in two opposite limit positions of rod movement to connect, alternatively, one or the other of the pressure ports to a shift signal line.

2. A shift system as defined in claim 1 wherein said shift signal generating means further includes an adjustable sleeve in said housing and surrounding said rod and with ports therein to control the exact relation between said pressure ports and the means on said rod.

3. In a hydromechanical multi-mode transmission having a hydrostatic unit with at least one variable displacement axial piston unit having a controlling swash plate movable to two shift positions at either side of a neutral position, means for generating a pair of shift signals representing said shift positions including a rod connected to the swash plate, a housing in which said rod moves and having a pair of shift signal passages and a fluid pressure passage, and means on said rod to interconnect the fluid pressure passage with a shift signal passage when the swash plate is in one of said positions.

4. In a transmission as defined in claim 3 including a sleeve threadably mounted in said housing and surrounding said rod and having at least two sets of ports with ports of one set aligned with the fluid pressure passage and one of the shift signal passages and the ports of the other set aligned with the fluid pressure passage and the other of the shift signal passages, said sleeve being longitudinally adjustable by rotation thereof to vary the location of said sets of ports relative to said interconnecting means on the rod.

5. A transmission as defined in claim 4 including means to rotate and hold said sleeve in 90° increments of rotation and each set of ports having four ports.

6. A multi-mode hydromechanical transmission shift system having a hydrostatic unit with a variable displacement component having hydraulically operable displacement controlling means including a control servo, a transmission ratio governor responsive to engine speed and power demand for positioning of the control servo, a plurality of clutches with each clutch operable to set the transmission for operation in a particular mode, a clutch selector valve and a sequence valve for controlling supply of pressure fluid to a particular clutch and said sequence valve also controlling the connection of the transmission ratio governor to the control servo, means for generating a pair of shift signals corresponding to two different shift positions of the displacement controlling means, a shift valve positioned responsive to either of the shift signals for initial delivery of fluid pressure to a clutch to initiate mode shift, a selector valve and an upshift qualifying valve in parallel to both receive either of said shift signals and selectively permit passage thereof to the shift valve with the selector valve responsive to a brake signal to permit downshifts and the upshift qualifying valve being responsive to speed of a prime mover to permit upshifts, an hysteresis valve to receive said shift signals and responsive to pressure in the control servo to permit passage of an upshift shift signal to said selector valve and the upshift qualifying valve and temporarily block a downshift shift signal to the last-mentioned valves and also responsive to a change in vehicle speed to unblock passage of said downshift shift signal, and a memory valve positioned responsive to clutch pressurization for controlling application of a shift signal to said shift valve.

7. A shift system as defined in claim 6 wherein said transmission has three modes of operation and the same shift signal is generated for shift from Mode I to Mode II and the upper end of Mode III operation, means for directing said last-mentioned signal to the clutch selector valve, and said clutch selector valve having means to block said shift signal when the transmission is operating in Mode III.

8. A shift system as defined in claim 6 wherein there are three clutches operable one in each of three modes of operation, a supply pressure line connected to said sequence valve, a pair of lines extended from the sequence valve with one line connected to the clutch selector valve and the other line connected to one of the clutches, said clutch selector valve controlling the connection of said one line to either of the other two clutches.

9. A three-mode hydromechanical transmission shift system having a hydrostatic unit with a variable displacement component having hydraulically operable displacement controlling means including a control servo, a transmission ratio governor for positioning of the control servo a plurality of clutches with each clutch individually operable to set the transmission for operation in one of the three modes, a clutch selector valve and a sequence valve for controlling supply of pressure fluid to a particular clutch and said sequence valve also controlling the connection of the transmission ratio governor to the control servo, means for generating a pair of shift signals corresponding to two different shift positions of the displacement controlling means, a plural position shift valve positioned responsive to either of the shift signals for movement from a previous position for initial delivery of fluid pressure to a clutch to initiate mode shift, an hysteresis valve to receive said shift signals and responsive to pressure in the control servo to permit passage of an upshift shift signal and temporarily block a downshift shift signal and also responsive to a change in output speed to unblock passage of said downshift shift signal, and a memory valve positioned responsive to clutch pressurization for controlling application of a shift signal to said shift valve to shift the shift valve from its previous position.

10. A multi forward speed mode hydromechanical transmission shift system having a hydrostatic unit with at least one variable and reversible displacement component with displacement setting means operable to control the direction and amount of displacement, a plurality of independently operable members with the operation of a selected one of the members setting the speed mode in which the transmission will operate, a control circuit including a plural position mode shift device positionable in either of two positions by the shift signal and having plural lines of communication to said independently operable members and positionable to cause operation of a selected one of said independently operable members for the desired mode of operation by activation of a selected line of communication, shift signal generating means operable by said displacement component and for delivering a shift signal to said control circuit when said displacement component has reached a mode shift indicating position requiring operation of a different one of said independently operable members characterized by a two-position memory device for receiving and controlling the application of the shift signal to the mode shift device as a pilot signal for positioning thereof, said memory device having positioning means connected to said lines of communication to set the memory device in one position when one of the independently operable members is in operation by activation of one of said lines of communication and set the memory device in the second position when another of said independently operable members is in operation by activation of another of said lines of communication whereby the shift signal is directed to the mode shift device to cause a change in position thereof at the initiation of a mode shift.

11. A hydromechanical transmission as set forth in claim 10 wherein said independently operable members are clutches and said control circuit is a hydraulic circuit with said memory device being a two-position valve and the position thereof being determined by the particular clutch which is engaged.

12. A hydromechanical transmission as set forth in claim 10 and usable for a vehicle including means in the control circuit which senses vehicle engine speed and differentiates between upshifts and downshifts between modes and prevents nuisance reshifts.

13. A hydromechanical transmission as defined in claim 12 wherein the means for preventing nuisance reshifts comprises a hysteresis valve which responds to a finite change in engine speed to control delivery of said shift signal to said memory device.

14. A hydromechanical transmission as defined in claim 13 wherein said hysteresis valve is positioned for passage of the shift signal therethrough when upshifting between modes and is at least temporarily in a position to block said shift signal when downshifting between modes, and means for changing the position of the hysteresis valve after passage of a shift signal therethrough to block passage of an identical shift signal and thus avoid said nuisance reshift.

15. A hydromechanical transmission as defined in claim 10 and having three modes of operation and with the displacement setting means operable between two control positions at either side of zero displacement to control the direction and amount of displacement, one of said control positions providing for shift between modes I and II and also being the position of the displacement setting means at the end of mode III and means in the control circuit associated with the memory valve to discriminate between the two conditions that may exist at said one control position.

16. A hydromechanical transmission as defined in claim 10 wherein said displacement setting means includes a swash plate and a control servo, a transmission ratio governor for positioning of the control servo, said plurality of independently operable members are clutches and said mode shift device includes a clutch selector valve, a sequence valve, and a shift valve in said control circuit positioned responsive to a shift signal for initial delivery of fluid pressure to a clutch to initiate mode shift, an hysteresis valve for receiving said shift signals and responsive to pressure in the control servo to permit passage of an upshift shift signal and temporarily block a downshift shift signal and also responsive to speed of a vehicle or the like driven by the transmission to unblock passage of said downshift shift signal, means for changing the position of the hysteresis valve after passage of a shift signal therethrough to block passage of an identical shift signal and thus avoid nuisance reshifts, and said memory device being a memory valve positioned responsive to clutch pressurization.

* * * * *